US012253773B2

(12) United States Patent
Morimoto et al.

(10) Patent No.: US 12,253,773 B2
(45) Date of Patent: Mar. 18, 2025

(54) LIQUID CRYSTAL DISPLAY DEVICE

(71) Applicant: Japan Display Inc., Tokyo (JP)

(72) Inventors: Masateru Morimoto, Tokyo (JP); Jin Hirosawa, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 18/508,385

(22) Filed: Nov. 14, 2023

(65) Prior Publication Data
US 2024/0176195 A1    May 30, 2024

(30) Foreign Application Priority Data
Nov. 30, 2022 (JP) .................... 2022-191380

(51) Int. Cl.
*G02F 1/1362* (2006.01)
*G02F 1/1337* (2006.01)
*G02F 1/1343* (2006.01)

(52) U.S. Cl.
CPC .. *G02F 1/136209* (2013.01); *G02F 1/133711* (2013.01); *G02F 1/136227* (2013.01); *G02F 1/134318* (2021.01); *G02F 1/134363* (2013.01); *G02F 1/136222* (2021.01)

(58) Field of Classification Search
None
See application file for complete search history.

(56) References Cited

U.S. PATENT DOCUMENTS

2019/0258099 A1    8/2019 Ozeki et al.
2022/0326581 A1*  10/2022 Kimura ............ G02F 1/134363

FOREIGN PATENT DOCUMENTS

JP      2019144386 A      8/2019
KR   2015-0091258    *   8/2015

* cited by examiner

*Primary Examiner* — Dung T Nguyen
(74) *Attorney, Agent, or Firm* — Maier & Maier, PLLC

(57) ABSTRACT

The present invention has been made to improve the anti-reflection effect of a light shielding film on the upper surface of a through-hole and provide improved image quality. Disclosed is a liquid crystal display device including a TFT substrate and a counter substrate. The TFT substrate is configured such that a pixel electrode and a common electrode are formed on an organic passivation film, and that a through-hole for connecting the pixel electrode to a TFT is formed in the organic passivation film. A capacitor insulating film is formed between the common electrode and the pixel electrode. A light shielding film is formed and layered on the common electrode. The through-hole is filled with resin. At the upper surface of the through-hole, the capacitor insulating film is formed on the resin. The light shielding film and the common electrode are formed on the capacitor insulating film.

13 Claims, 13 Drawing Sheets

LIQUID CRYSTAL DISPLAY DEVICE

CLAIM OF PRIORITY

The present application claims priority from Japanese Patent Application JP 2022-191380 filed on Nov. 30, 2022, the content of which is hereby incorporated by reference into this application.

BACKGROUND OF THE INVENTION

1. Field of the Invention

The present invention relates to a high-definition liquid crystal display device.

2. Description of the Related Art

Liquid crystal display devices include a thin-film transistor (TFT) substrate and a counter substrate. The TFT substrate is configured such that pixels having, for example, a pixel electrode and a TFT are formed in a matrix form. The counter substrate is disposed to face the TFT substrate. Liquid crystal is sandwiched between the TFT substrate and the counter substrate. Images are formed by allowing liquid crystal molecules to control the transmittance of light from a backlight on an individual pixel basis.

The liquid crystal display devices are also used as a virtual reality (VR) display device (hereinafter referred to also as the VR) or other display device requiring a high-definition screen. Since the high-definition screen has a relatively small pixel pitch, the light transmittance of the pixels becomes a problem. Further, it is difficult to obtain a sufficient pixel capacity.

Described in Japanese Patent Laid-open No. 2019-144386 is a configuration for providing an increased pixel capacity by filling a through-hole connecting a pixel electrode to a TFT source electrode with a filling film for flattening purposes and sandwiching the pixel electrode between two common electrode layers.

SUMMARY OF THE INVENTION

When the liquid crystal display devices have high-definition capabilities, the light transmittance of a liquid crystal display panel becomes a problem. Elements such as a TFT, a wiring, and a through-hole for connection cannot be omitted from each pixel. This causes a light transmission region for image formation to inevitably become small. Meanwhile, as the pixel pitch becomes small, parallel misalignment (hereinafter referred to also as lateral misalignment) between the TFT substrate and the counter substrate becomes more likely to exert an influence. Stated differently, when the pixel pitch becomes small, a problem may occasionally occur due to lateral misalignment that has been conventionally insignificant.

The present invention has been made to provide a small pixel pitch, high-definition liquid crystal display device that is able to suppress a decrease in light transmittance and reduce the influence of lateral misalignment between a TFT substrate and a counter substrate.

Further, the problem caused by the lateral misalignment between the TFT substrate and the counter substrate can be solved by forming a color filter and a light shielding film on the TFT substrate instead of forming them on the counter substrate. In this case, however, a new problem arises. The present invention has been made to provide a configuration for solving the problems arisen in such a configuration.

The present invention overcomes the problems described above. Specific means for solving the problems are described below.

(1) There is provided a liquid crystal display device including a TFT substrate and a counter substrate. An organic passivation film is formed over a thin-film transistor that includes a semiconductor film, a gate electrode, a drain electrode, and a source electrode. A pixel electrode and a common electrode are formed on the organic passivation film. A through-hole for connecting the pixel electrode to the TFT is formed in the organic passivation film. The counter substrate is disposed to face the thin-film transistor substrate with a liquid crystal layer sandwiched therebetween. A capacitor insulating film is formed between the common electrode and the pixel electrode. A light shielding film is formed and layered on the common electrode. The through-hole is filled with resin. At an upper surface of the through-hole, the capacitor insulating film is formed on the resin. The light shielding film and the common electrode are formed on the capacitor insulating film.

(2) The liquid crystal display device as described in (1) is configured such that the common electrode is disposed on the light shielding film.

(3) The liquid crystal display device as described in (1) is configured such that the light shielding film is formed by a multilayer film including a metal film.

(4) The liquid crystal display device as described in (1) is configured such that the common electrode is formed by a transparent oxide conductive film, and that the light shielding film is formed on the common electrode, and further that a second transparent oxide conductive film made by the same material as the common electrode is formed on the common electrode.

DETAILED DESCRIPTION OF THE PREFERRED EMBODIMENTS

Embodiments of the present invention will now be described in detail. Liquid crystal display devices have either a pixel electrode top structure or a common electrode top structure depending on whether a pixel electrode is positioned higher or lower than a common electrode. The following description of the embodiments assumes that the common electrode top structure is adopted. Further, conventionally, a color filter has been often formed on a counter substrate. However, in high-definition liquid crystal display devices, the color filter is occasionally formed on a TFT substrate. This is referred to as a color filter on array (COA) structure. The present invention is applicable to both of these structures. A first embodiment will be described on the assumption that the COA structure is adopted. A third embodiment will be described on the assumption that the color filter is formed on the counter substrate.

First Embodiment

Figure 1:
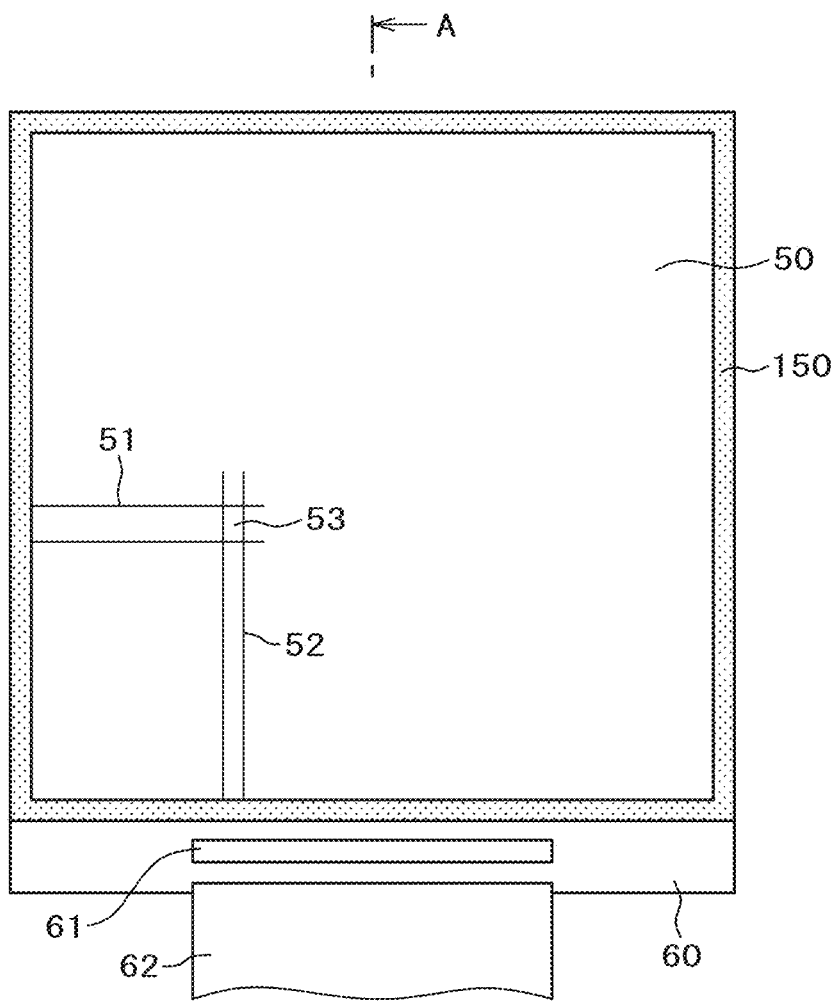
FIG. 1 is a plan view illustrating a liquid crystal display device.
Figure 2:
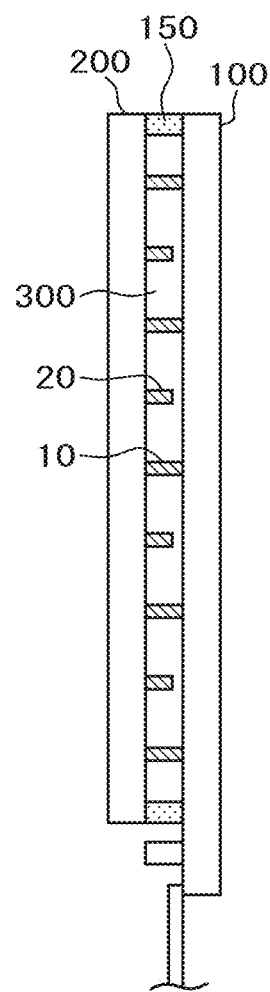
FIG. 2 is a cross-sectional view taken along line A-A of FIG. 1.

FIG. 1 is a plan view illustrating a liquid crystal display device according to a first embodiment. FIG. 2 is a cross-sectional view taken along line A-A of FIG. 1. Referring to FIGS. 1 and 2, a TFT substrate 100 and a counter substrate 200 are positioned close to each other and bonded together with a sealing material 150, and liquid crystal 300 is filled in the space among these substrates 100 and 200 and the sealing material 150. A display region 50 is formed in a region where the TFT substrate 100 and the counter substrate 200 overlap with each other. On the TFT substrate 100 within the display region 50, a scan line 51 is extended in the horizontal direction (x direction) and arranged in the vertical direction (y direction). Further, a video signal line 52 is extended in the vertical direction and arranged in the horizontal direction. Pixels 53 are formed in regions enclosed by the scan lines 51 and the video signal lines 52.

The TFT substrate 100 is formed to be larger than the counter substrate 200, and a portion where the TFT substrate 100 does not overlap with the counter substrate 200 serves as a terminal region 60. A flexible wiring substrate 62 for supplying power and signals to the liquid crystal display device is connected to the terminal region 60. Further, a driver IC 61 for forming, for example, a video signal is disposed in the terminal region 60. In a case where the terminal region 60 has a small area, the driver IC 61 is occasionally mounted toward the flexible wiring substrate.

The space between the TFT substrate 100 and the counter substrate 200, that is, the thickness of the liquid crystal layer 300, needs to remain constant across the whole display region. Therefore, as indicated in FIG. 2, columnar spacers 10 and 20 are disposed toward the counter substrate 200 to keep the space between the TFT substrate 100 and the counter substrate 200. In some cases, however, the columnar spacers are formed toward the TFT substrate 100.

Two different columnar spacers, namely, the main columnar spacer 10 and the sub-columnar spacer 20, are used. Under normal conditions, the main columnar spacer 10 defines the space between the TFT substrate 100 and the counter substrate 200. The sub-columnar spacer 20 is formed to have a height lower than the main columnar spacer 10. Under normal conditions, the sub-columnar spacer 20 is not in contact with the TFT substrate 100. However, when pushing pressure is applied to the counter substrate 200 or the TFT substrate 100, the sub-columnar spacer 20 comes into contact with the TFT substrate 100 and thus avoids an extreme decrease in the gap between the TFT substrate 100 and the counter substrate 200. The sub-columnar spacer 20 is larger in diameter than the main columnar spacer 10, and is greater in number than the main columnar spacer 10.

Although not depicted in FIG. 1, a scan signal drive circuit for forming a scan signal is formed on picture frames on both sides of the display region 50. Such a drive circuit as above often adopts a TFT that uses a polysilicon semiconductor. In the present embodiment, an oxide semiconductor is used as the TFT in the display region. The TFT using the oxide semiconductor is lower in mobility than the TFT using the polysilicon semiconductor. However, the leakage current of the TFT using the oxide semiconductor is smaller than that of the TFT using the polysilicon semiconductor. Therefore, the TFT using the oxide semiconductor is suitable as a switching element in the pixels.

When a pixel pitch becomes small, the accuracy of alignment between the TFT substrate 100 and the counter substrate 200 becomes an issue although it does not become an issue when a conventional pixel pitch is adopted. This issue can be effectively addressed by forming a color filter 201 and a black matrix (light shielding film) 202 on the TFT substrate 100 although they have been conventionally formed on the counter substrate. Comparative examples and the first embodiment, which will be described with reference to FIGS. 3 to 9, are configured such that the color filter 201 and the black matrix (light shielding film) 202 are disposed toward the TFT substrate 100.

Figure 3:
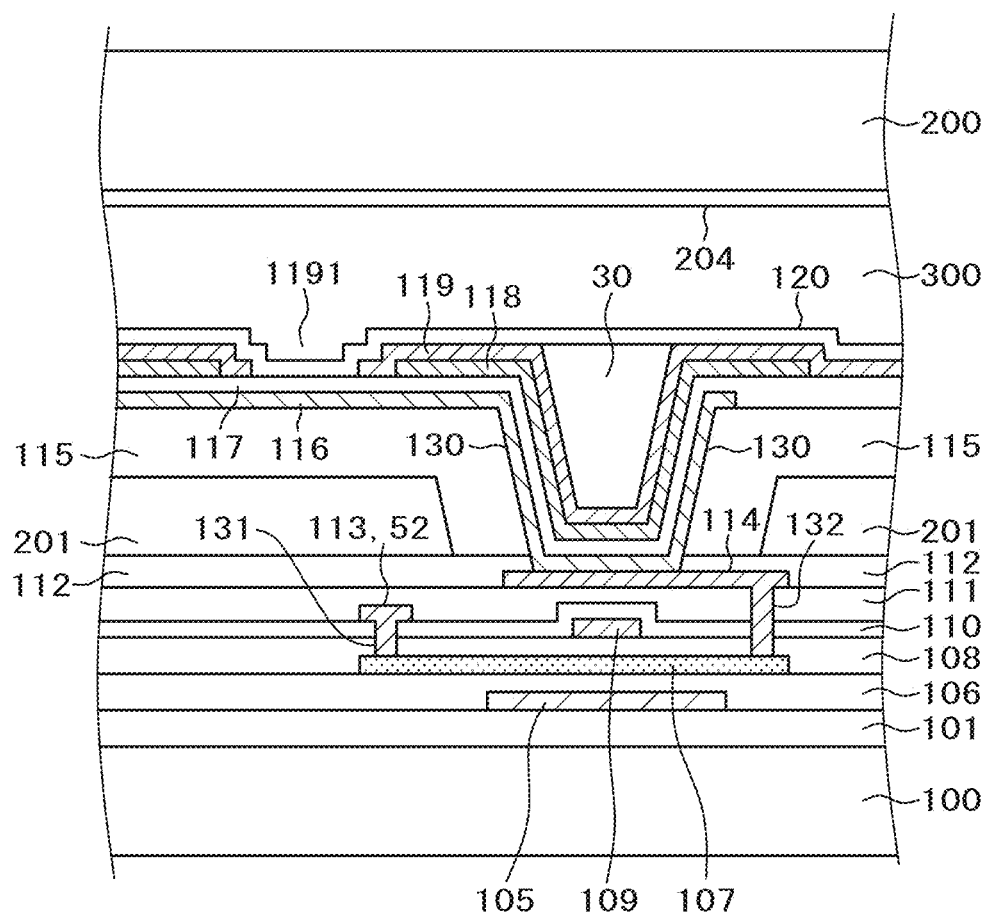
FIG. 3 is a cross-sectional view illustrating a display region of a liquid crystal display device according to a first comparative example.

FIG. 3 is a cross-sectional view illustrating a pixel region having an oxide semiconductor TFT in the liquid crystal display device according to a first comparative example. Referring to FIG. 3, a base film 101 is formed on the TFT substrate 100, which is formed, for example, by glass. The base film 101 plays a role of avoiding contaminating an oxide semiconductor 107 with impurities, for example, from the glass substrate 100. The base film 101 generally has a two-layer structure that is formed by a silicon nitride layer (hereinafter referred to also as the SiN layer) and a silicon oxide layer (hereinafter referred to also as the SiO layer).

A first light shielding film 105 is formed on the base film 101. The first light shielding film 105 is extended in the same direction as the scan line 51 depicted in FIG. 3 and arranged in the same direction as the scan line 51. The first light shielding film 105 shields light from a backlight by covering the undersides, for example, of the oxide semiconductor TFT 107 and a through-hole 130.

A first interlayer insulating film 106 is formed over the first light shielding film 105. The first interlayer insulating film 106 has a two-layer structure that is formed by the SiN layer, which is the lower layer, and by the SiO layer, which is the upper layer. This structure is adopted to avoid removing oxygen from the oxide semiconductor 107 formed on the first interlayer insulating film 106. The SiN layer may alternatively be omitted from the first interlayer insulating film 106.

The oxide semiconductor film 107 formed on the first interlayer insulating film 106 forms a TFT channel under a gate electrode 109.

A gate insulating film 108 is formed over the oxide semiconductor film 107. The gate insulating film 108 is formed by two SiO layers, namely, a first SiO layer and a second SiO layer. The first SiO layer, which is oxygen-rich, corresponds to a channel section of the oxide semiconductor film 107. The second SiO layer, which has a dense film, corresponds to the remaining section of the oxide semiconductor film 107. The first SiO layer is formed by an oxygen-rich film in order to be able to supply oxygen to the oxide semiconductor film 107.

The gate electrode 109 is formed on the gate insulating film 108. As a material for the gate electrode 109, for example, molybdenum tungsten alloy (MoW), titanium (Ti), or a layered film formed by layering indium tin oxide (ITO), Ti, aluminum (Al), and Ti.

Incidentally, FIG. 3 depicts a top-gate structure in which the TFT channel section is formed under the gate electrode 109. However, a dual-gate TFT can be obtained by applying a gate voltage to the first light shielding film 105 that is formed by a metal material.

A second interlayer insulating film 110 is formed over the gate electrode 109. In many cases, the second interlayer insulating film 110 also has a two-layer structure that is formed by the SiN layer and the Sio layer. Further, the SiO layer is the lower layer in many cases. This structure is adopted to avoid removing oxygen from the oxide semiconductor film 107.

After the second interlayer insulating film 110 is formed, a through-hole 131 is formed in the gate insulating film 108 and the second interlayer insulating film 110 to form the video signal line 52 and a drain electrode 113, which is a part of the video signal line 52, and then a third interlayer insulating film 111 is formed. A source electrode 114 is connected to the oxide semiconductor film 107 through a through-hole 132 that is formed in the second interlayer insulating film 110 and the third interlayer insulating film 111. Further, a fourth interlayer insulating film 112 is formed over the source electrode 114 and the third interlayer insulating film 111. The drain electrode 113 is formed by a metal. Meanwhile, the source electrode 114 is an ITO electrode, which is a transparent electrode, and is connected to a pixel electrode 116 through a through-hole formed in the fourth interlayer insulating film 112. In the through-hole 131, the video signal line 52 plays a role of the drain electrode 113, and is connected with the oxide semiconductor film 107, which is rendered conductive. As is the case, for example, with a first gate electrode 104, the video signal line 52 can be formed, for instance, by MoW, Ti, or Ti—Al—Ti layered film. Moreover, the third interlayer insulating film 111 and the fourth interlayer insulating film 112 are inorganic insulating films formed, for example, by a SiN layer.

The color filter 201 is formed over the drain electrode 113, the source electrode 114, and the fourth interlayer insulating film 112, and an organic passivation film 115 is formed over the color filter 201. The color filter 201 is conventionally formed toward the counter substrate 200. However, in the present embodiment and the comparative examples, the color filter 201 is formed toward the TFT substrate 100 in order to avoid the influence of the accuracy of alignment between the TFT substrate 100 and the counter substrate 200. The color filter 201 and the organic passivation film 115 are both formed to have a great thickness of 1 to 2 μm in order to allow these films to function as a flattening film and reduce capacitive coupling between the video signal line 52 and the pixel electrode 116 or the common electrode 119.

Since the common electrode top structure is depicted in FIG. 3, the pixel electrode 116 is formed on the organic passivation film 115 by using an ITO film, which is a transparent conductive film. The pixel electrode 116 is rectangular to fit the shape of the pixels. The through-hole 130 is formed in the organic passivation film 115 and the color filter 201 in order to connect the pixel electrode 116 and the source electrode 114 with each other.

Referring to FIG. 3, a capacitor insulating film 117 is formed on the pixel electrode 116, a second light shielding film 118 is formed on the capacitor insulating film 117 by using a metal layer film, and the common electrode 119 is formed on the second light shielding film 118 by using ITO. The second light shielding film 118 plays a role of the black matrix formed on the counter substrate having a conventional configuration. The second light shielding film 118 is formed, for example, by a layered film formed by layering molybdenum (Mo), ITO, Ti, Al, and Ti, and has a total thickness of approximately 70 nm. Referring to FIG. 3, the second light shielding film 118 is formed to be layered with the common electrode 119, and forms an anti-reflection film in collaboration with the common electrode 119. Further, the second light shielding film 118 reduces voltage fluctuations in the common electrode 119.

Referring to FIG. 3, the common electrode 119 is formed over the second light shielding film 118. The second light shielding film 118 merely covers a portion of the display region that requires light shielding. However, the common electrode 119 uniformly covers the whole display region. The common electrode 119 is formed by using an ITO film, which is a transparent conductive film, and has a greater resistance value than metals. However, a uniform common voltage is constantly applied to the whole display region with the help of the second light shielding film 118, which is formed by a metal.

Meanwhile, a pixel capacity is formed between the pixel electrode 116 and the common electrode 119 through the capacitor insulating film 117 in order to maintain the pixel voltage of the pixel electrode 116 for a 1-frame period. Referring to FIG. 3, in order to increase the pixel capacity, the capacitor insulating film 117, the second light shielding film 118, and the common electrode 119 are also formed in the through-hole 130 in addition to the pixel electrode 116.

Referring to FIG. 3, the through-hole 130 formed in the color filter 201 and the organic passivation film 115 has a large area and depth. The presence of such a large hole causes an increased misalignment of liquid crystal molecules in the vicinity of the hole. Further, there is another problem where an alignment film material, which is a liquid, does not enter the through-hole 130 at the time of alignment film formation. Furthermore, in a case where external pushing pressure is applied to the TFT substrate 100 or the counter substrate 200, for example, the columnar spacer 10 or 20 might drop into this through-hole 130. In order to avoid the above-described problems, an embedded membrane 30 is formed as depicted in FIG. 3. The embedded membrane 30 is formed by using the same material as the organic passivation film 115. The organic passivation film 115 is formed, for example, by using photosensitive acrylic resin. Stated differently, since the material itself is resist, there is no need to separately form resist.

A first alignment film 120 is formed over the common electrode 119 and the embedded membrane 30. The first alignment film 120 and a second alignment film 204, which is formed toward the counter substrate 200, define the initial alignment of the liquid crystal molecules. The alignment films 120 and 204 are formed by polyimide. Alignment processing of the alignment films 120 and 204 may be performed by using a rubbing method or by executing an optical alignment process through the use of polarized ultraviolet light.

When a voltage is applied to the pixel electrode 116, electric lines of force are generated in a slit 1191 in the common electrode 119. The generated electric lines of force pass from the pixel electrode 116 toward the common electrode 119 through the liquid crystal layer 300, and rotate the liquid crystal molecules to change the light transmittance of the liquid crystal layer 300. An image is formed by changing the light transmittance of the liquid crystal layer 300 on an individual pixel basis. That is, in-plane switching (IPS) is performed.

In the first embodiment, the pixels have an extremely small area. Meanwhile, the thicknesses of the organic passivation film 115 and color filter 201 cannot be reduced. Therefore, it is difficult to reduce the size of the through-hole 130 as well. Consequently, in order to save space, the through-hole 130 for the organic passivation film 115 is formed directly above the TFT as depicted in FIG. 3.

Referring to FIG. 3, the counter substrate 200 is disposed with the liquid crystal layer 300 sandwiched between the counter substrate 200 and the TFT substrate 100. Since the color filter 201 and the black matrix (light shielding film) 202 are both formed toward the TFT substrate 100 as depicted in FIG. 3, only the second alignment film 204 is formed toward the counter substrate 200. Therefore, the accuracy of alignment between the counter substrate 200 and the TFT substrate 100 does not affect the image quality of the liquid crystal display device. The alignment processing of the second alignment film 204 is the same as that of the first alignment film 120 formed toward the TFT substrate 100.

Figure 4:
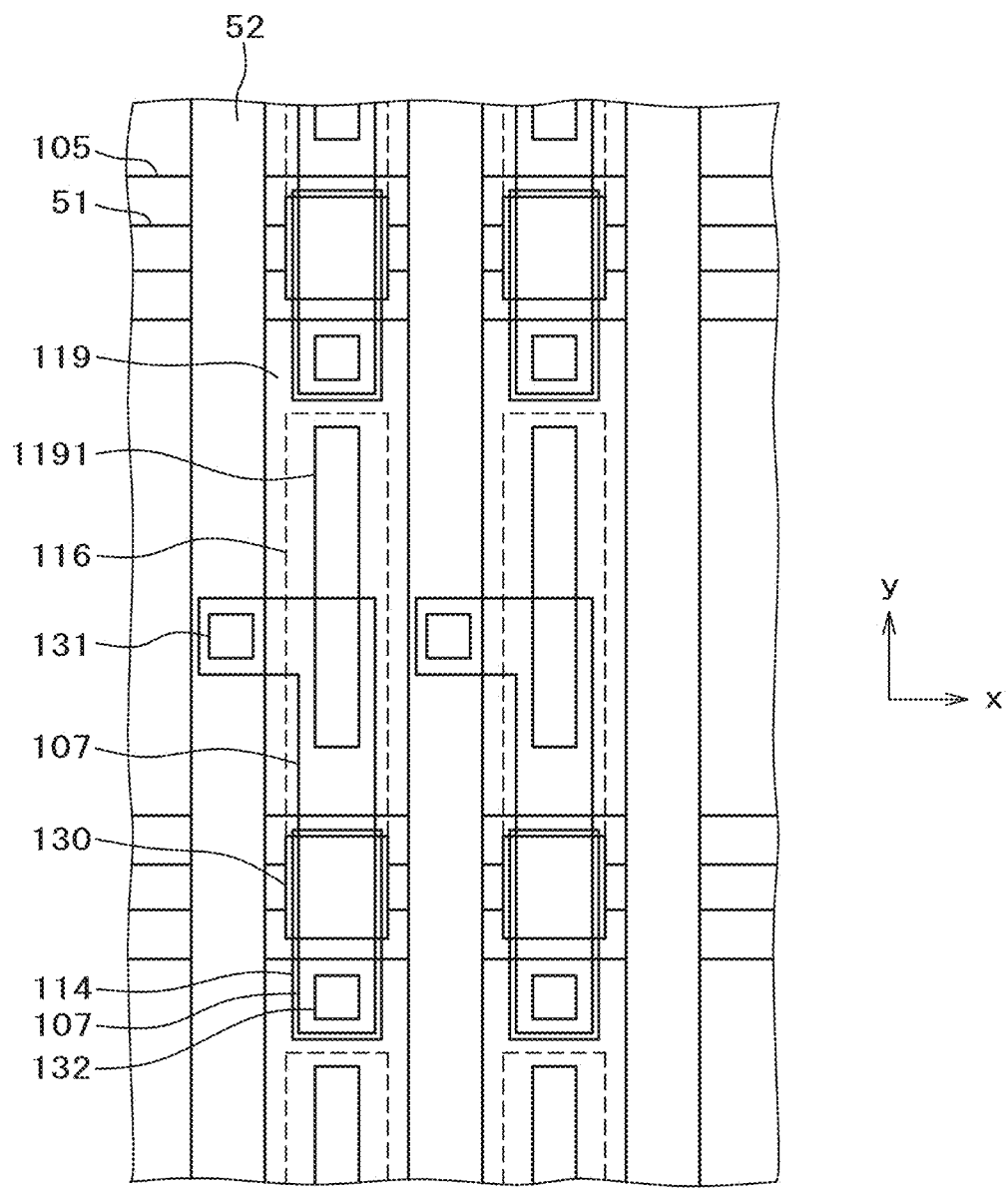
FIG. 4 is a plan view illustrating the display region on the side toward a TFT substrate of the liquid crystal display device according to the first comparative example depicted in FIG. 3.

FIG. 4 is a plan view illustrating the side toward the TFT substrate 100 depicted in FIG. 3. However, FIG. 4 does not depict all elements. The reason is to avoid a complicated drawing. Referring to FIG. 4, the first light shielding film 105 and the scan line 51 are extended in the horizontal direction (x direction) and arranged in the vertical direction (y direction). Further, the video signal line 52 is extended in the vertical direction and arranged in the horizontal direction. Referring to FIG. 4, a TFT is formed to overlap with the first light shielding film 105. Stated differently, for example, the TFT is light-shielded from the backlight.

Referring to FIG. 4, the oxide semiconductor film 107, which acts as a drain wire from the through-hole 131 formed in the video signal line 52, is vertically extended in the pixels toward the scan line 51. Since the oxide semiconductor film 107 is rendered conductive and transparent, it does not significantly decrease the light transmittance. Further, a portion of the oxide semiconductor film 107 that overlaps with the gate electrode 109 and the first light shielding film 105 acts as a channel and thus forms a TFT.

Referring to FIG. 4, the oxide semiconductor film 107, which is rendered conductive, is further extended downward in the y direction, and connected to the source electrode 114, which is formed in the through-hole 132 by using ITO. The source electrode 114 is extended upward in the y direction, and connected to a pixel electrode 106 depicted in FIG. 5 in the through-hole 130 and a through-hole formed in the fourth interlayer insulating film 112. That is, referring to FIG. 4, in a region between the through-hole 132 and the through-hole 130, the source electrode 114 and the oxide semiconductor 107, which is rendered conductive, exist in overlap with each other as viewed from the top.

Figure 5:
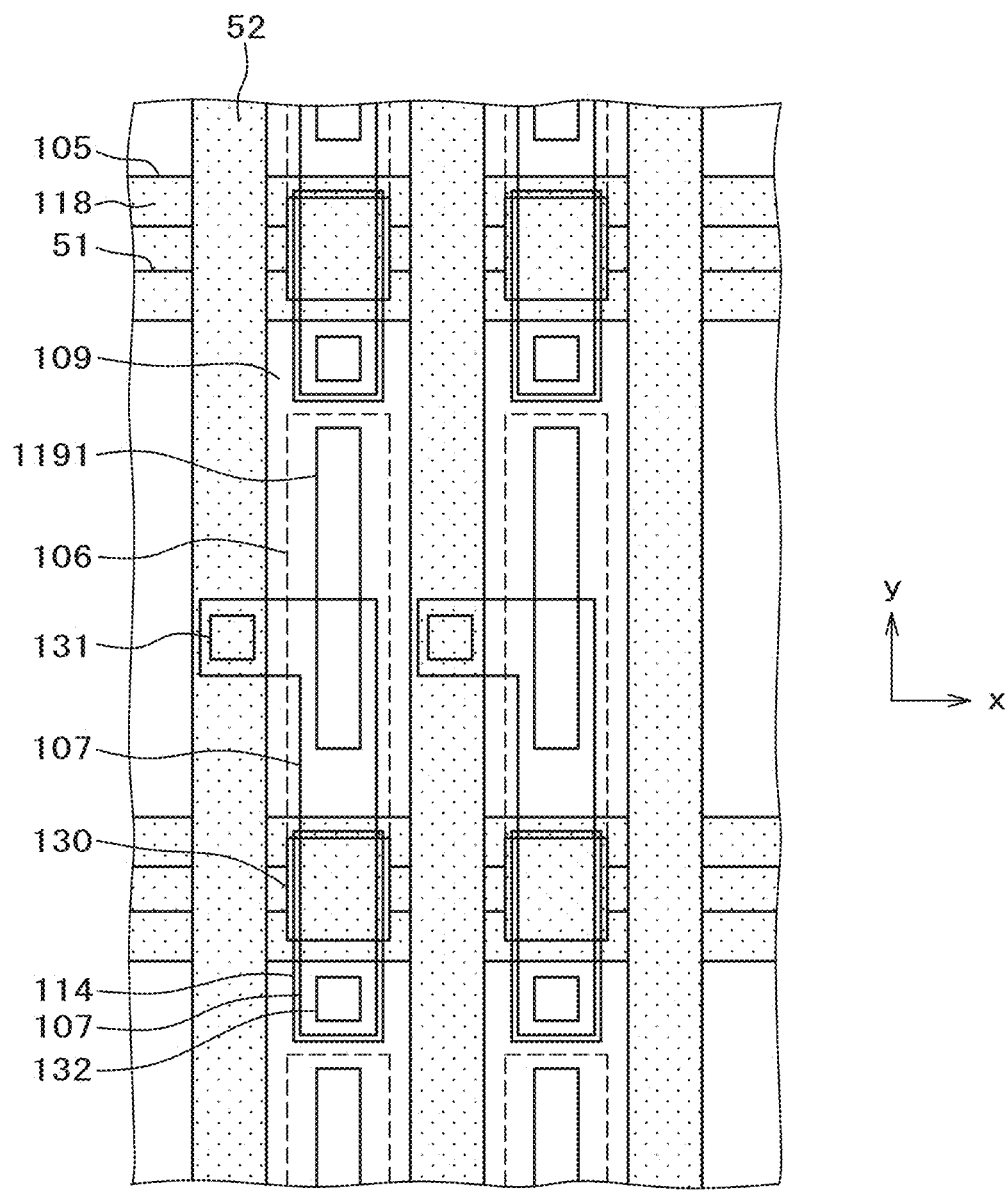
FIG. 5 is a plan view illustrating an example of a light shielding film formation range.

FIG. 5 illustrates an example of the range of the second light shielding film 118 formed on the TFT substrate 100 in the configuration depicted in FIG. 4. The second light shielding film 118 is formed under the common electrode 119, which is formed over the whole display region. Therefore, the second light shielding film 118 can be formed within a desired range as viewed from the top. The formation range of the second light shielding film 118 is shaded in FIG. 5. More specifically, the second light shielding film 118 is formed in a position overlapping with the first light shielding film 105 and the video signal line 52. That is, the second light shielding film 118 covers the video signal line 52 and the through-hole 130.

The second light shielding film 118 plays a role of an anti-reflection film. The second light shielding film 118 is formed by a multilayer film in order to ensure that the second light shielding film 118 functions as an anti-reflection film. This multilayer film is designed to become most effective when formed in a planar shape. However, in the configuration depicted in FIG. 3, the second light shielding film 118 is formed in the through-hole 130. Therefore, this section does not produce a sufficient anti-reflection effect, and thus causes the reflection of external light. This results in image quality degradation.

Figure 6:
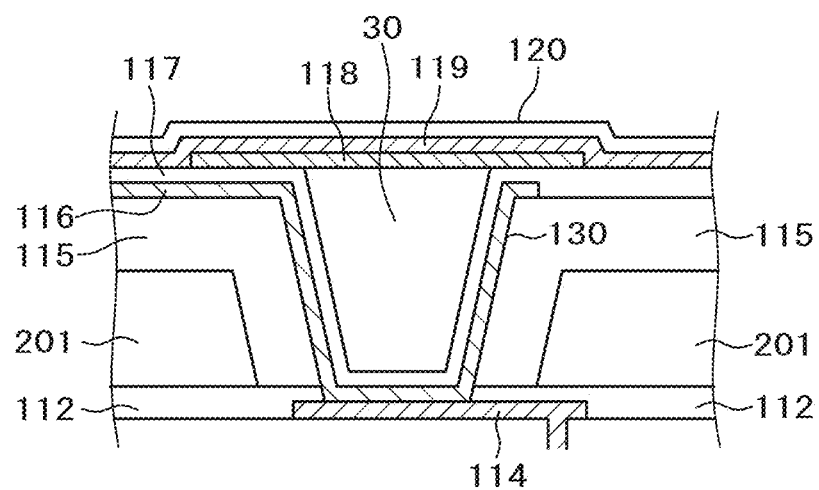
FIG. 6 is a cross-sectional view illustrating a through-hole and its vicinity in a liquid crystal display device according to a second comparative example.

FIG. 6 is a cross-sectional view illustrating the through-hole 130 and its vicinity according to a second comparative example as the countermeasure for the light reflection. For ease of understanding, FIG. 6 and subsequent figures depict only the configuration of the through-hole 130 and its vicinity. FIG. 6 differs from FIG. 5 in that, after the capacitor insulating film 117 is formed by using SiN, a filling film 30 is formed in the through-hole 130 to flatten the surface within the through-hole 130. Subsequently, the second light shielding film 118 (anti-reflection film) is formed. Therefore, the configuration depicted in FIG. 6 flattens the second light shielding film 118 (anti-reflection film), and thus produces a sufficient anti-reflection effect.

However, the configuration depicted in FIG. 6 does not form the pixel capacity within the through-hole 130, and thus provides a smaller pixel capacity than the configuration depicted in FIG. 3. If the thickness of the capacitor insulating film 117 is increased to compensate for such a decreased pixel capacity, the capacitor insulating film 117 disposed in the through-hole 130 is likely to be destroyed. This makes it difficult to achieve original design objectives.

Figure 7:
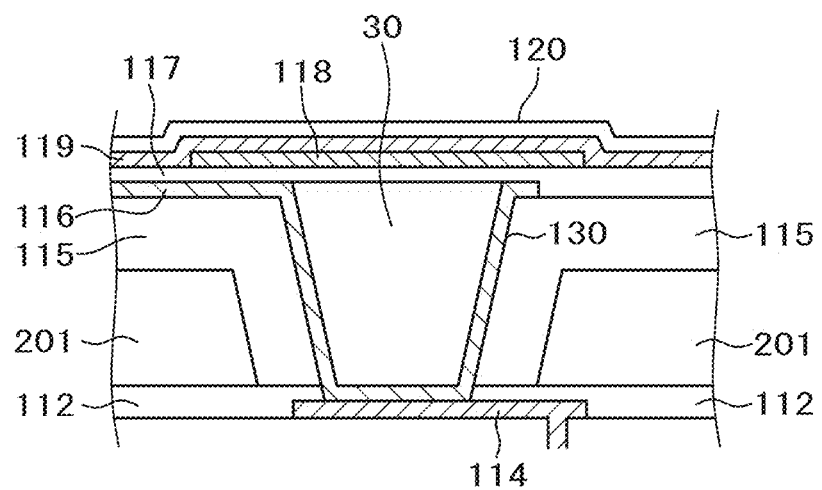
FIG. 7 is a cross-sectional view illustrating a through-hole and its vicinity in a liquid crystal display device according to a first form of a first embodiment.

FIG. 7 is a cross-sectional view illustrating the through-hole 130 and its vicinity according to a first form of the first embodiment of the present invention. FIG. 7 differs from FIG. 6 in that the filling film 30 for the through-hole 130 is formed after formation of the pixel electrode 116. Referring to FIG. 7, after the pixel electrode 116 is formed in the through-hole 130, the filling film 30 is formed in the through-hole 130. Subsequently, the capacitor insulating film 117 is formed. However, at the time of formation of the capacitor insulating film 117, the surface of the through-hole 130 is already flattened by the filling film 30.

Another aspect where FIG. 7 differs from FIG. 6 is that the second light shielding film 118 is formed on the capacitor insulating film 117. Therefore, the capacitor insulating film 117 need not be formed over a bump in the through-hole 130. That is, the capacitor insulating film 117 can be thinned.

As described above, according to the configuration depicted in FIG. 7, the capacitor insulating film 117 is formed on the flattened surface of the through-hole 130. Therefore, even when the thickness of the capacitor insulating film 117 is decreased to increase the pixel capacity, the capacitor insulating film 117 is unlikely to be destroyed. Further, the second light shielding film 118 to be disposed on the capacitor insulating film 117 is formed on the capacitor insulating film 117. Therefore, the second light shielding film 118 is able to fully demonstrate its properties as a light shielding film or anti-reflection film.

Figure 8:
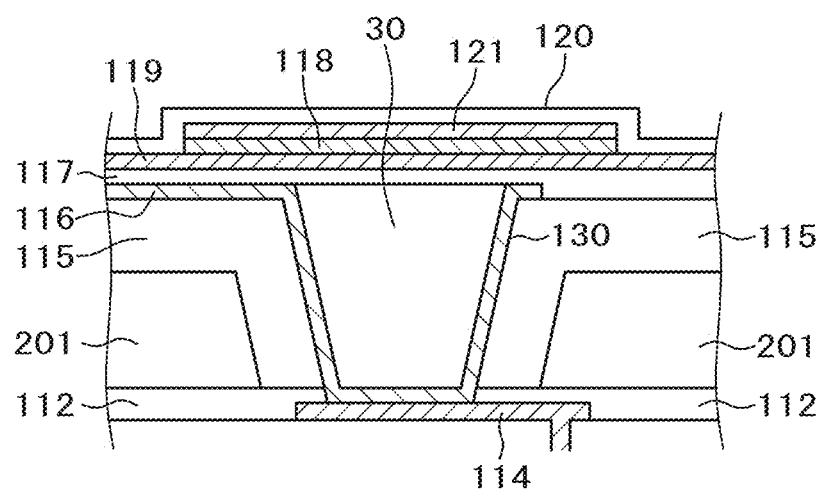
FIG. 8 is a cross-sectional view illustrating a through-hole and its vicinity in the liquid crystal display device according to a second form of the first embodiment.

FIG. 8 is a cross-sectional view illustrating a configuration of the through-hole 130 and its vicinity according to a second form of the first embodiment. FIG. 8 differs from FIG. 7 in that the second light shielding film 118 is disposed on the common electrode 119, which is formed by using ITO, and that an anti-reflection ITO film 121 is disposed on the second light shielding film 118.

In the configuration depicted in FIG. 7, the second light shielding film 118 is covered by the common electrode 119. Therefore, there is a risk that step discontinuities of the common electrode 119 may occur at an end of the second light shielding film 118. To avoid this risk, in the configuration depicted in FIG. 8, the second light shielding film 118 is formed on the common electrode 119.

However, in order to allow the second light shielding film 118 to adequately function as a light shielding film or anti-reflection film, an ITO film needs to exist on the uppermost surface. Accordingly, in the configuration depicted in FIG. 8, the anti-reflection ITO film 121 is formed on the second light shielding film 118. The thickness of the anti-reflection ITO film 121 is in the range, for example, of 50 to 70 nm.

Further, the second light shielding film 118 and the anti-reflection ITO film 121 are in the same pattern. Therefore, photolithography can be performed in common for the second light shielding film 118 and the anti-reflection ITO film 121.

Figure 9:
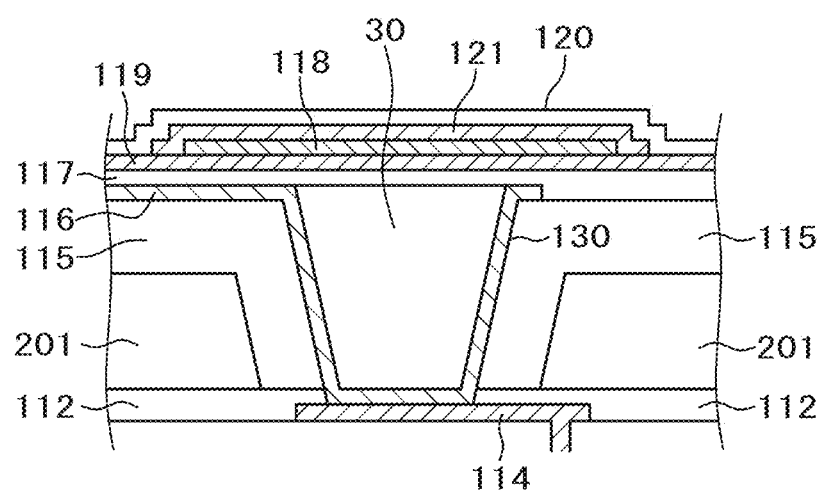
FIG. 9 is a cross-sectional view illustrating the through-hole and its vicinity in the liquid crystal display device according to a third form of the first embodiment.

FIG. 9 is a cross-sectional view illustrating a configuration of the through-hole 130 and its vicinity according to a third form of the first embodiment. FIG. 9 differs from FIG. 8 in that the anti-reflection ITO film 121 formed on the second light shielding film 118 covers the lateral surface of the second light shielding film 118 as well. When the configuration depicted in FIG. 8 is adopted in a situation where the second light shielding film 118 includes a corrosion-prone metal such as Al, the second light shielding film 118 is likely to start corroding from its lateral surface.

Meanwhile, the ITO film is chemically stable because it is an oxide conductive film. Therefore, the ITO film prevents the second light shielding film 118, which is formed by a metal, from starting to corrode from its lateral surface.

Incidentally, in the configuration common to the first to third forms of the first embodiment, the pixel electrode 116 formed in the through-hole 130 is directly sandwiched, on both sides, between the filling film 30 and the organic passivation film 115, which is formed, for example, by using acrylic resin. Further, the capacitor insulating film 117 is formed on the upper surface of the through-hole 130 flattened by the filling film 30, and the common electrode 119 or the second light shielding film 118 which is formed by a metal, is formed on the capacitor insulating film 117.

In the above-described configuration, the color filter 201 is formed under the organic passivation film 115. However, an alternative is to adopt a configuration in which the color filter 201 is formed above the organic passivation film 115. When such an alternative configuration is adopted, the pixel electrode 116 in the through-hole 130 is directly sandwiched between the color filter 201 and the filling film 30.

Second Embodiment

A second embodiment will now be described. The second embodiment discloses a configuration in which the filling film 30 flattens the surface of the through-hole 130 on which, for example, the capacitor insulating film 117, the second light shielding film 118, and the common electrode 119 are formed.

Figure 10:
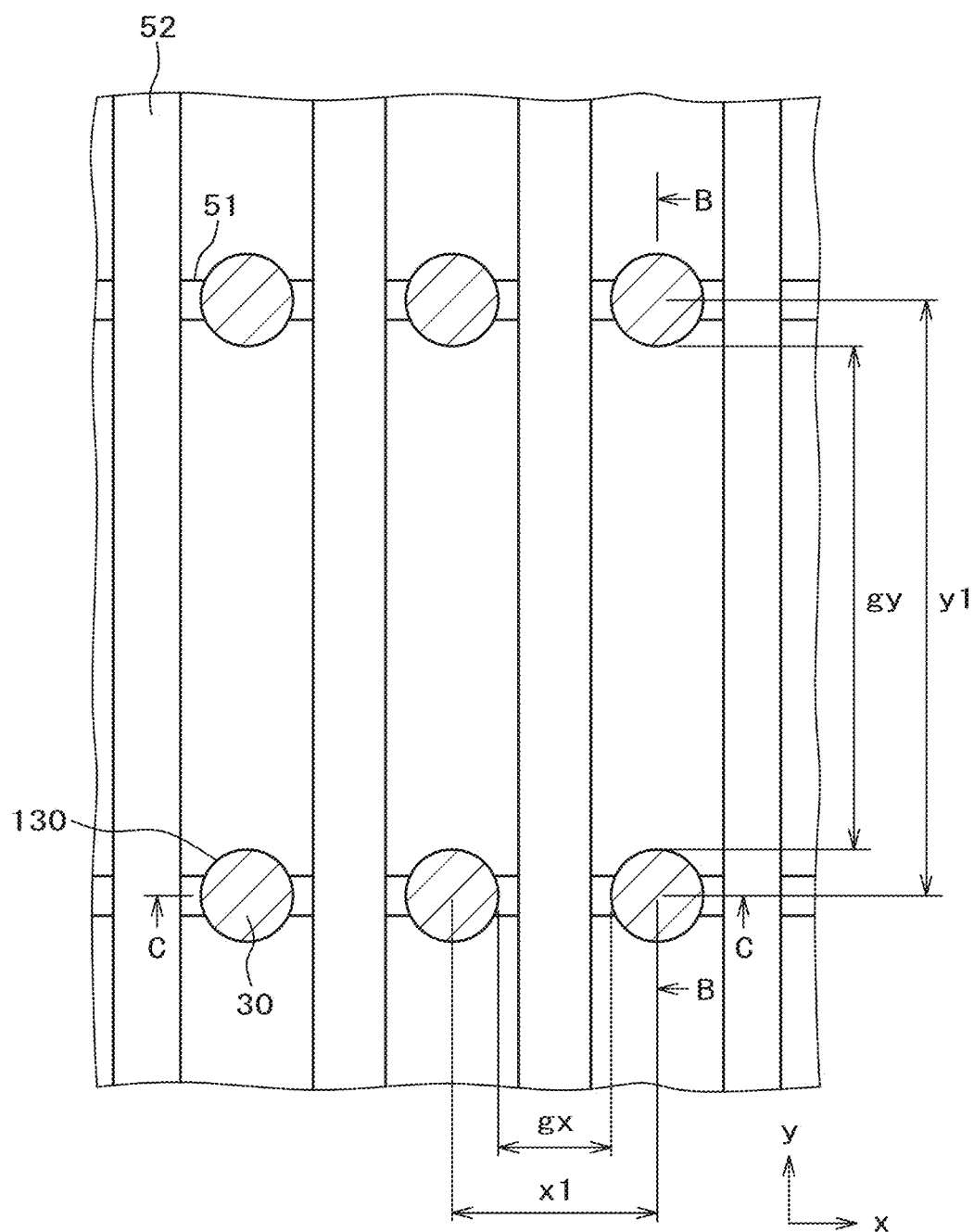
FIG. 10 is a plan view illustrating a pixel including the through-hole.

FIG. 10 is a plan view of a pixel, depicting only the video signal line 52, the scan line 51, and the through-hole 130. Referring to FIG. 10, the scan line 51 is extended in the horizontal direction (x direction) and arranged in the vertical direction (y direction). Further, the video signal line 52 is extended in the vertical line and arranged in the horizontal line. FIG. 10 illustrates a case where the through-hole 130 is not very large. The filling film 30, which is hatched in FIG. 10, is formed in the through-hole 130.

Referring to FIG. 10, the through-hole 130 has a vertical pitch of y1 and a horizontal pitch of x1. The vertical space between one through-hole 130 and an adjacent through-hole 130 is gy, and the horizontal space is gx. Referring to FIG. 10, the space gx and the space gy are both sufficiently greater than the size of the through-hole 130. Therefore, each through-hole 130 exists independently of the others.

Figure 11:
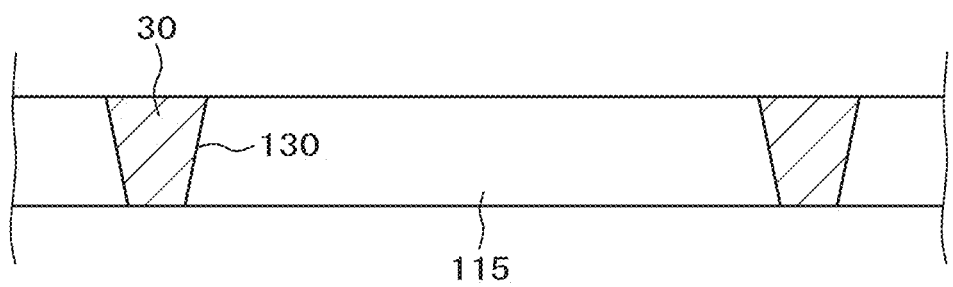
FIG. 11 is a cross-sectional view taken along line B-B of FIG. 10.

FIG. 11 is a cross-sectional view taken along line B-B of FIG. 10. FIG. 11 depicts only the organic passivation film 115, the through-hole 130, and the filling film 30. For example, the pixel electrode 116, the common electrode 119, the capacitor insulating film 117, and the second light shielding film 118 are omitted from FIG. 11. Although the organic passivation film 115 and the filling film 30 are formed by the same material, only the filling film 30 is hatched in FIG. 11 for ease of understanding.

Referring to FIG. 11, two through-holes 130 are sufficiently apart from each other and formed without interfering with each other. Therefore, the filling film 30 is independently filled into each through-hole 130.

Figure 12:
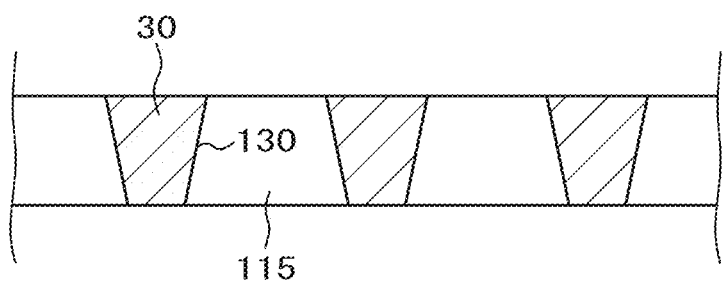
FIG. 12 is a cross-sectional view taken along line C-C of FIG. 10.

FIG. 12 is a cross-sectional view taken along line C-C of FIG. 10. The space between the through-holes 130 depicted in FIG. 11 is smaller than that depicted in FIG. 11. However, the through-holes 130 are formed without interfering with each other. Therefore, the filling film 30 is independently filled into each through-hole 130.

Figure 13:
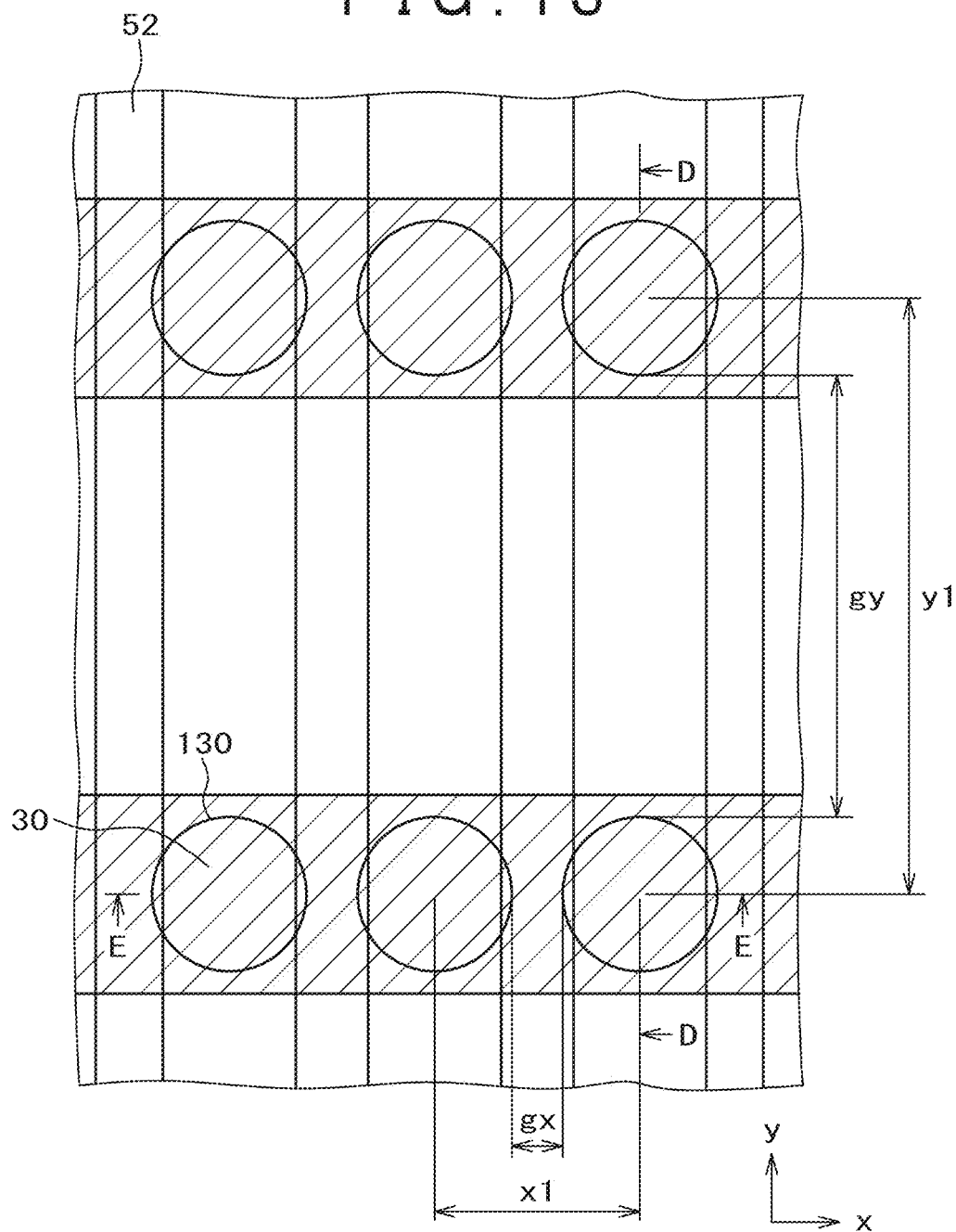
FIG. 13 is another plan view illustrating the pixel including the through-hole.

FIG. 13 is a plan view of a pixel, in a case where the through-hole 130 is large, depicting only the video signal line 52 and the through-hole 130. Since the diameter of the through-hole 130 is large in FIG. 13, a scan line 52 extended in the horizontal direction (x direction) is hidden under the through-hole 130 and not visible. The diameter of the through-hole 130 increases with an increase in the thickness of the organic passivation film 115.

Referring to FIG. 13, the vertical (y direction) pitch y1 and the horizontal pitch x1 of the through-hole 130 are the same as those depicted in FIG. 10. However, the space between one through-hole 130 and an adjacent through-hole 130 is small. Nevertheless, although the vertical space gy is sufficiently large, the horizontal space gx is small. Therefore, when the through-holes 130 are formed, they interfere with each other so as to decrease the thickness of the organic passivation film 115 in a direction in which the through-holes 130 are adjacent to each other.

Accordingly, in the configuration depicted in FIG. 13, the filling films 30 each having a width greater than the diameter of the through-hole 130 are formed into horizontal stripes. Subsequently, the filling film 30 not required for flattening is removed. Consequently, the shape of the through-hole 130 differs between a cross-sectional view as viewed in the vertical direction (y direction) and a cross-sectional view as viewed in the horizontal direction (x direction).

Figure 14:
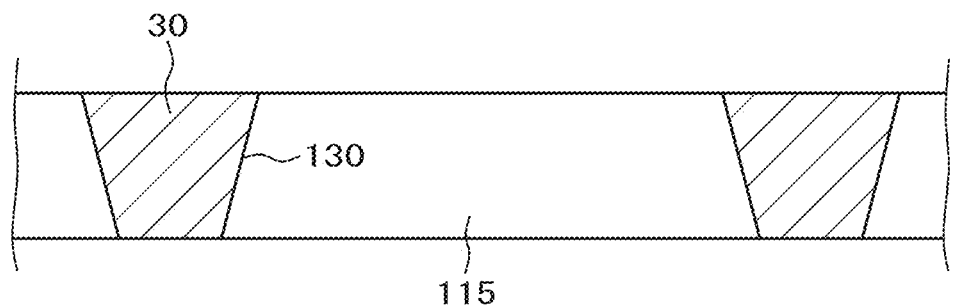
FIG. 14 is a cross-sectional view taken along line D-D of FIG. 13.

FIG. 14 is a cross-sectional view taken along line D-D of FIG. 13. Even when the diameter of the through-hole 130 is increased, the vertical space gy is sufficiently large. Therefore, each through-hole 130 exists independently without interfering with another through-hole 130. Consequently, the filling film 30 is filled into each through-hole 130.

Figure 15:
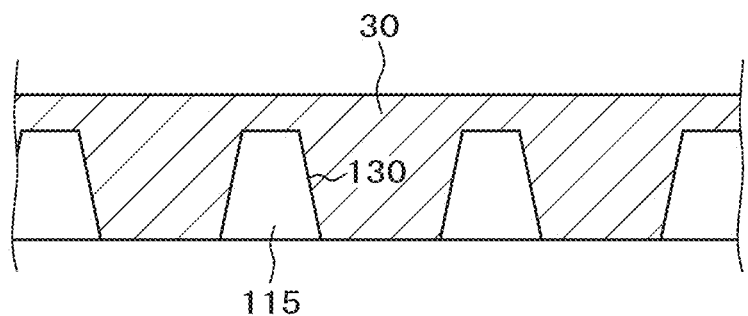
FIG. 15 is a cross-sectional view taken along line E-E of FIG. 13.

FIG. 15 is a cross-sectional view taken along line E-E of FIG. 13. In the horizontal direction, when the diameter of the through-hole 130 is increased, the space between one through-hole 130 and an adjacent through-hole 130 is decreased so that the adjacent through-holes 130 interfere with each other at the time of through-hole formation. That is, a decrease occurs in the thickness of the organic passivation film 115 between the adjacent through-holes 130.

Consequently, the upper surface of a through-hole 130 will not be fully flattened by merely forming the filling film 30 in the through-hole 130. It is necessary to additionally form the filling film 30 on the organic passivation film 115 between the adjacent through-holes 130.

When the above-described filling film 30 is formed, the upper surface of the through-holes 130 can be flattened even in a case where the diameter of the through-holes 130 is increased. This makes it possible to obtain the light shielding film 118 capable of properly producing the light shielding effect and anti-reflection effect as described in conjunction with the first embodiment, and provide a necessary pixel capacity.

Third Embodiment

The first and second embodiments of the present invention have been described on the assumption that the so-called COA structure is employed with the color filter 201 formed toward the TFT substrate 100. However, the present invention is not limited to the use of such a structure, but is also applicable to a liquid crystal display device having a normal structure in which the color filter 201 and the black matrix 202 are formed toward the counter substrate 200.

Figure 16:
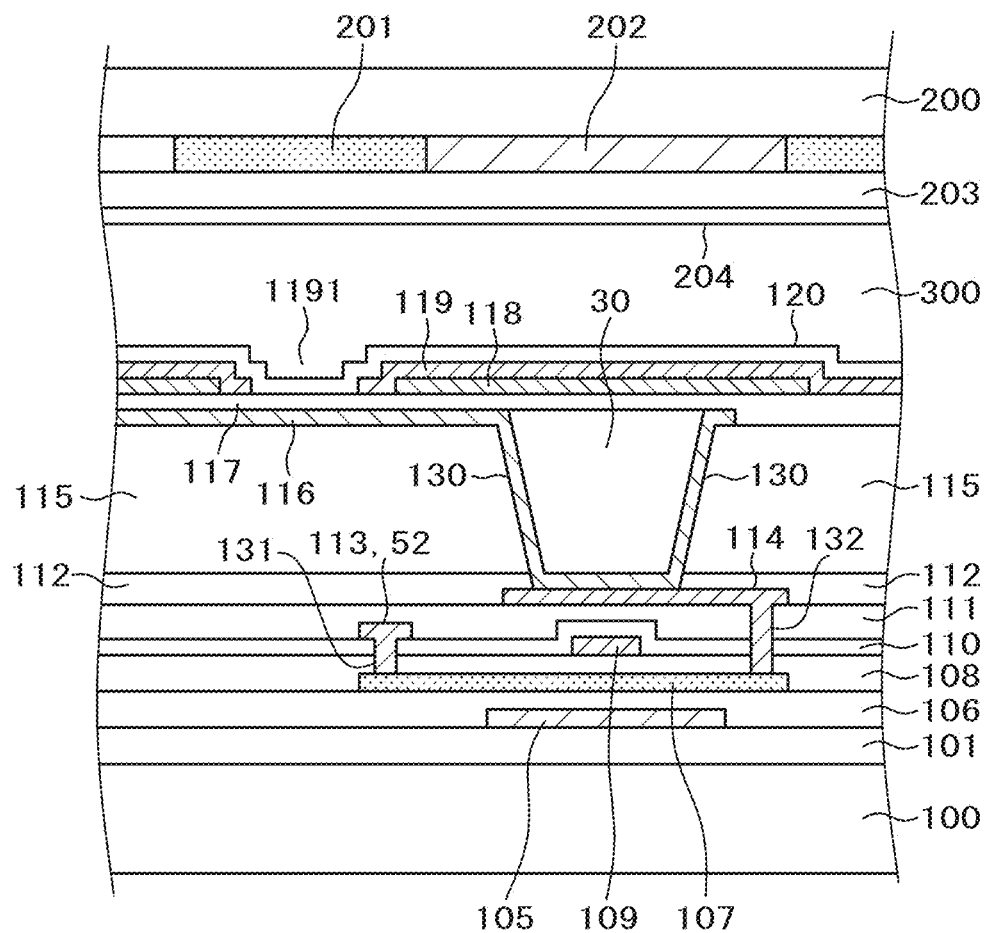
FIG. 16 is a cross-sectional view illustrating the liquid crystal display device according to a third embodiment.

FIG. 16 is a cross-sectional view illustrating a pixel section of the liquid crystal display device according to a third embodiment. Referring to FIG. 16, the color filter 201, the black matrix 202, and an overcoat membrane 203 are formed toward the counter substrate 200. The color filter 201 is not formed on the TFT substrate 100 depicted in FIG. 16. The other component elements of the TFT substrate 100 are the same as the corresponding component elements according to the first form of the first embodiment. That is, the configuration of the through-hole 130 and its vicinity in FIG. 16 is the same as the configuration of the first form of the first embodiment, which is illustrated in FIG. 7.

Referring to FIG. 16, the counter substrate 200 is disposed with the liquid crystal layer 300 sandwiched between the counter substrate 200 and the TFT substrate 100. The color filter 201 and the black matrix 202 are formed toward the counter substrate 200. The color filter 201 is used to form a color image. The black matrix 202 is used to improve the contrast of the image. The overcoat membrane 203 is formed over the color filter 201 and the black matrix 202. The overcoat membrane 203 prevents a color pigment in the color filter 201 from seeping out into the liquid crystal layer 300. The second alignment film 204 is formed over the overcoat membrane 203. The role played by the second alignment film 204 is the same as the already described role of the first alignment film 120.

In the configuration depicted in FIG. 16, the second light shielding film 118 disposed toward the TFT substrate 100 is not indispensable because the black matrix 202 is formed toward the counter substrate 200. However, the second light shielding film 118 existing toward the TFT substrate 100 produces various effects, for example, of shutting out external light not covered by the black matrix 201, preventing color mixing by light coming from the inside, and preventing a voltage drop in the common electrode 119. Therefore, it is preferable that the second light shielding film 118 exist toward the TFT substrate 100.

Although the first form of the first embodiment, which is illustrated in FIG. 7, is applied to the configuration depicted in FIG. 16, for example, the second embodiment depicted in FIG. 8 and the third embodiment depicted in FIG. 9 are also applicable to the configuration depicted in FIG. 16.

What is claimed is:

1. A liquid crystal display device comprising:
   a TFT substrate that is configured such that an organic passivation film is formed over a thin-film transistor including a semiconductor film, a gate electrode, a drain electrode, and a source electrode, and that a pixel electrode and a common electrode are formed on the organic passivation film, and further that a through-hole for connecting the pixel electrode to the thin-film transistor is formed in the organic passivation film; and
   a counter substrate that is disposed to face the TFT substrate with a liquid crystal layer sandwiched therebetween,
   wherein a capacitor insulating film is formed between the common electrode and the pixel electrode, and a light shielding film is in contact with the common electrode, the through-hole is filled with resin, and
   at directly above of the through-hole, the capacitor insulating film is in contact with the resin, and the light shielding film and the common electrode are formed on the capacitor insulating film.

2. The liquid crystal display device according to claim 1, wherein the common electrode is disposed on the light shielding film.

3. The liquid crystal display device according to claim 1, wherein the light shielding film is formed by a multilayer film including a metal film.

4. The liquid crystal display device according to claim 1, wherein the common electrode is formed by a transparent oxide conductive film, and
   the light shielding film is formed on the common electrode, and a second transparent oxide conductive film made by a same material as the common electrode is formed on the common electrode.

5. The liquid crystal display device according to claim 4, wherein the second transparent oxide conductive film is formed in a same pattern as the light shielding film.

6. The liquid crystal display device according to claim 4, wherein the second transparent oxide conductive film is formed over a lateral surface of the light shielding film.

7. The liquid crystal display device according to claim 1, wherein a scan line and a video signal line are formed on the TFT substrate, the scan line being extended in a first direction and arranged in a second direction, the video signal line being extended in the second direction and arranged in the first direction, and
   the through-hole is formed in such a manner that a cross-section along the first direction is different from a cross-section along the second direction.

8. The liquid crystal display device according to claim 7, wherein, in the cross-section along the first direction, the resin is formed on the organic passivation film having the through-hole formed therein.

9. The liquid crystal display device according to claim 1, wherein the pixel electrode is formed in the through-hole, and in the through-hole, the pixel electrode is directly sandwiched between the organic passivation film and the resin.

10. The liquid crystal display device according to claim 1, wherein a color filter is formed under the organic passivation film.

11. The liquid crystal display device according to claim 10, wherein the counter substrate has a display region and a peripheral region, the display region being formed without a color filter nor a light shielding film.

12. The liquid crystal display device according to claim 1, wherein the organic passivation film is made by a same material as the resin.

13. The liquid crystal display device according to claim 1, wherein
the counter substrate includes an alignment film, and
the alignment film is in contact with the counter substrate.

\* \* \* \* \*